No. 699,781. Patented May 13, 1902.
F. C. ATHERTON & C. HAPP.
BACK PEDALING BRAKE.
(Application filed Dec. 9, 1901.)
(No Model.)
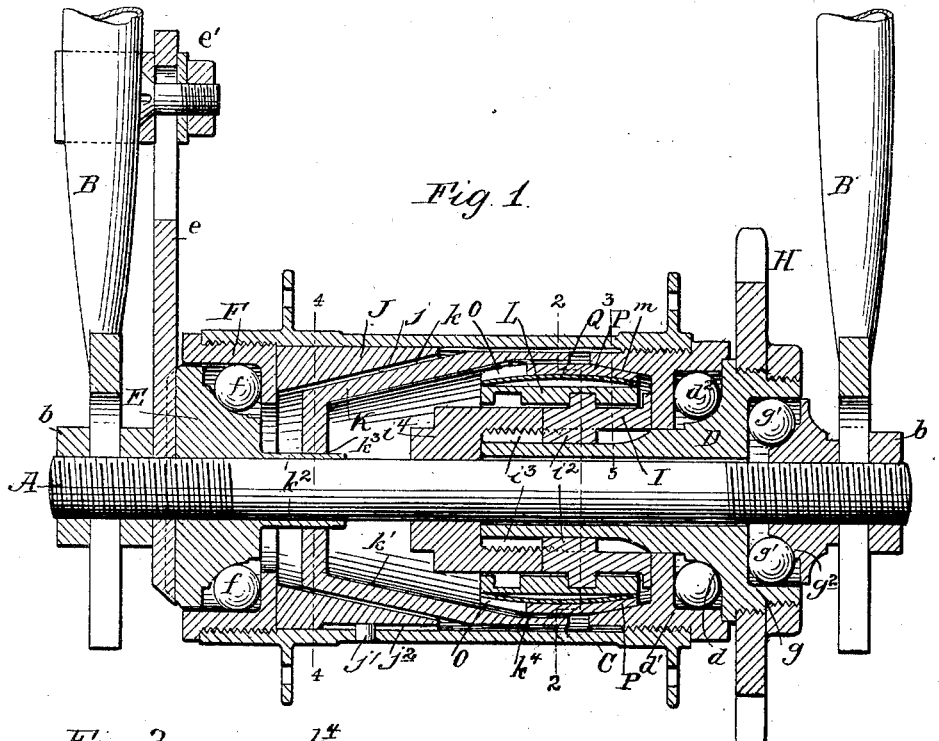
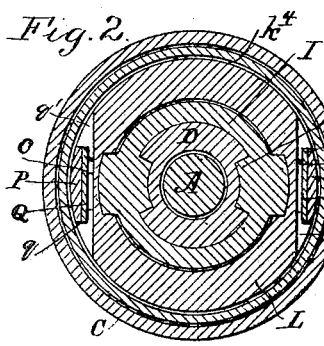
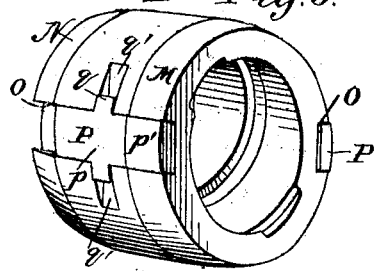
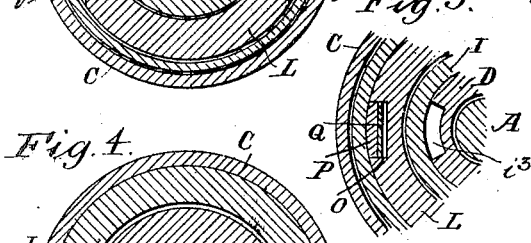
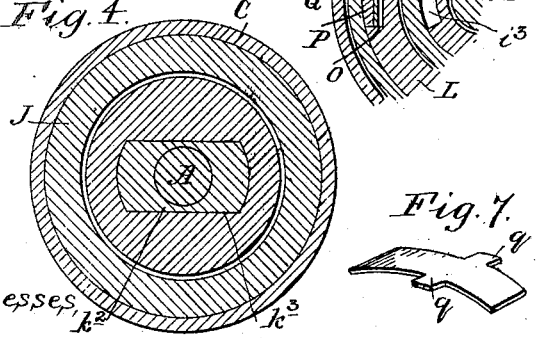
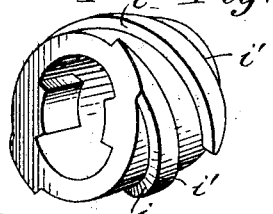
Witnesses
E. A. Volk
F. F. Schuyuger
F. C. Atherton and Inventors.
Conrad Happ
by Wilhelm Bonner
Attorneys
THE NORRIS PETERS CO., PHOTO-LITHO., WASHINGTON, D. C.

UNITED STATES PATENT OFFICE.

FISHER C. ATHERTON AND CONRAD HAPP, OF BUFFALO, NEW YORK; SAID HAPP ASSIGNOR TO SAID ATHERTON.

BACK-PEDALING BRAKE.

SPECIFICATION forming part of Letters Patent No. 699,781, dated May 13, 1902.

Application filed December 9, 1901. Serial No. 85,166. (No model.)

*To all whom it may concern:*

Be it known that we, FISHER C. ATHERTON and CONRAD HAPP, citizens of the United States, and residents of Buffalo, in the county of Erie and State of New York, have invented new and useful Improvements in Back-Pedaling Brakes, of which the following is a specification.

This invention relates to a back-pedaling coaster-brake for velocipedes and the like.

One of the objects of the invention is to provide an exceedingly simple, durable, and desirable brake of this character composed of the minimum number of parts.

Another object is to so construct and arrange the parts that they can be arranged inside of the wheel-hub and an extended braking-surface secured without crowding or necessitating the employment of small parts, which are liable to become broken.

In the accompanying drawings, Figure 1 is a longitudinal sectional elevation through a brake embodying the invention. Fig. 2 is a transverse section thereof on the line 2 2, Fig. 1. Fig. 3 is a fragmentary transverse section on the line 3 3, Fig. 1. Fig. 4 is a transverse section on the line 4 4, Fig. 1. Fig. 5 is an enlarged perspective view of the clutch-ring detached. Fig. 6 is a perspective view of the shifting-screw detached. Fig. 7 is a perspective view of one of the springs for the friction holding devices for the clutch-ring.

Like letters of reference refer to like parts in the several figures.

A represents the axle for the rear wheel of the velocipede, which is stationarily secured in the rear frame-fork, the ends of which are shown at B, as by the usual clamping-nuts $b$, and C represents the hub of the rear wheel, which is journaled to rotate on the axle by ball-bearings in any suitable manner. The construction shown in the drawings is as follows:

D represents a driving-sleeve which loosely surrounds the axle and has a reduced inner end which projects into the hub. The outer end of the sleeve, which is enlarged, is provided with an inwardly-facing ball cone or race $d$, between which and an outwardly-facing ball cup or race $d'$, secured in the adjacent end of the hub, are balls $d^2$.

E represents the cone of the companion ball-bearing for the opposite end of the hub. The cone is preferably screwed on the axle and is held from turning relative thereto by suitable means, such as an arm $e$, secured to or formed with the cone and which extends beside and is connected with the adjacent fork member, as by a clip $e'$, of any suitable construction adjustably connected with the arm. Balls $f$ are arranged between the cone E and an outwardly-facing ball-cup F, secured to the adjacent end of the hub. A ball-bearing for the driving-sleeve is preferably employed, which consists of a ball cup or race $g$, provided in the outer enlarged end of the driving-sleeve D, balls $g'$, and a cone $g^2$ therefor, screwed on the adjacent end of the axle between the same and the fork end and held by the clamping-nut for the axle.

H represents the sprocket or driving wheel, which is rigidly attached to the projecting enlarged end of the driving-sleeve in any approved manner, so that the latter can be turned by the wheel either forwardly or rearwardly. The inner reduced end of the driving-sleeve has fixed thereto a shifting ring I, provided with peripheral inclined or cam faces $i$ $i'$, which, as shown, are formed by a screw thread or threads. The shifting ring is preferably rigidly connected with the driving-sleeve, so as to rotate therewith, by radial projections $i^2$, extending inwardly from the shifting ring into longitudinal grooves or channels $i^3$ in the driving-sleeve, and is held from longitudinal movement between the ball-cup $d'$ and a nut $i^4$, screwed on the inner end of the driving-sleeve.

J represents a brake-ring of suitable material fitted tightly in the hub, preferably abutting against the left-hand ball-cup F, and provided with a conical cavity forming an extended conical friction-surface $j$. The brake-ring is held against rotation in the hub by a pin or stud $j'$, secured to the hub and engaging in a longitudinal slot $j^2$ in the brake-ring.

K represents a brake shoe or member which is in the form of a hollow cone having an extended external conical friction-surface $k$, adapted to coöperate with the internal conical face $j'$. The brake-shoe is mounted in the hub between the brake-ring and driving-sleeve, is movable laterally or longitudinally toward or from the brake-ring, and is held from rotation on the axle by suitable means—for instance, by an angular portion $k^2$ of the cone E engaging in a correspondingly-shaped slot or hole $k^3$, formed in the small end of the brake-shoe. The large end of the brake-shoe surrounds the inner end of the driving-sleeve and shifting ring and is provided with a short internal cylindrical face $k^4$.

L represents a clutch device which is in the form of a ring surrounding the shifting ring. It is provided with internal inclined or cam faces, preferably formed by a female screw thread or threads, with which the cam faces or threads of the shifting ring engage. The clutch-ring is provided at one end with an external conical clutch-face M, which coöperates with a corresponding internal conical face $m$, formed in the adjacent or inner end of the ball-cup $d'$. These coöperating faces constitute the driving-clutch. At its opposite end, which projects into the brake-shoe, the clutch-ring is provided with an oppositely-inclined conical face N, adapted to coöperate with or frictionally engage the internal conical face $k'$ of the brake-shoe. Between the conical faces M and N the external periphery of the clutch-ring is cylindrical, and this cylindrical portion is surrounded by the internal cylindrical face $k^4$ of the brake-shoe. The clutch-ring is moved longitudinally to bring its clutch-face M into engagement with the clutch-face $m$ on the hub by the well-known action of the coöperating cam-faces on the shifting ring and clutch-ring when the shifting ring is rotated forwardly, as in driving or propelling the velocipede forwardly, and it is moved longitudinally in the opposite direction to cause the engagement of the inclined face N with the internal conical face of the brake-shoe when the shifting ring is rotated or turned rearwardly, as in back-pedaling, to apply the brake.

In order to prevent the rotation of the clutch-ring by frictional contact with the shifting ring when the latter is rotated and to cause the same to move quickly longitudinally, the following means is employed: The clutch-ring is provided, preferably at diametrically opposite points, with longitudinal slots O, in which are seated friction holding devices P. These holding devices are similar, and each is provided for a portion of its length with a segmental cylindrical face $p$, circumferentially in line with the cylindrical peripheral face of the clutch-ring, and a segmental conical face $p'$, which is circumferentially in line with the conical clutch-face M of the clutch-ring. The holding devices are held or forced yieldingly outward by means of bowed leaf-springs Q, which are arranged in the slots O beneath the holding devices. To prevent longitudinal movement of the friction holding devices or springs in the slots, both the holding devices and the springs are preferably provided with lateral projections or lugs $q$, which extend into lateral slots $q'$ in the clutch-ring. The springs Q tend to hold the friction holding devices outward in frictional engagement either with the internal cylindrical face $k^4$ of the brake-shoe or the internal conical clutch-face $m$ of the hub, according to the longitudinal position of the clutch-ring. The engagement of the holding devices with either of said faces holds the clutch-ring from rotation relative thereto. When the rider desires to propel the velocipede forwardly, the pedals are turned forwardly and the shifting ring, which turns with the driving-wheel, moves the clutch-ring longitudinally into engagement with the driving clutch-face, which being conical forces the friction holding devices inwardly against the action of their springs, so that the outer segmental cylindrical faces of the same are practically flush with the cylindrical face of the clutch-ring and out of engagement with the cylindrical face $k^4$ of the brake-shoe. The clutch-ring is thus released from the brake-shoe and locked in the hub, which turns forwardly, together with the clutch-ring, shifting-ring, and driving-sleeve, while the pedals are being propelled forwardly. When it is desired to coast, the rider holds the pedals stationary, as is well known, which holds the driving-sleeve and shifting ring stationary. The clutch-ring, which is held to the driving clutch-face M on the hub by the friction holding devices, tends to continue its rotation with the hub, and thus through the action of the cam-faces on the clutch-ring and stationary shifting ring it is moved longitudinally slightly away from the driving clutch-face on the hub and permits the latter to rotate forwardly. As soon as the friction holding devices, which move with the clutch-ring, are out of contact with the driving clutch-face on the hub their springs move them into frictional contact with the internal cylindrical face of the brake-shoe, so that the clutch-ring, as well as the shifting ring and driving-sleeve, is held stationary. When it is desired to apply the brake, the rider back-pedals, causing the driving-sleeve and shifting ring to turn rearwardly, and as the clutch device is held from rotation by the engagement of the friction holding devices with the brake-shoe the shifting ring causes the clutch-ring to move longitudinally to bring its conical face N into contact with the internal conical face of the brake-shoe, and by a further backward movement of the driving-sleeve the clutch-ring causes the brake-shoe to move laterally until the external friction-surface thereof is wedged tightly into the internal conical braking-surface $j$ of the brake-ring. When propelling forwardly, the hub and driving-sleeve, which are locked together, run on the left-hand ball-bearing and the outer right-hand ball-bearing, and when coasting, the driving-sleeve being held stationary, the hub rotates on the left-hand ball-bearing and the inner right-hand ball-bearing.

A brake constructed as above described has but few parts, which can all be made comparatively large, very strong, and durable. An extended braking-surface is obtained, and all of the operative parts of the brake are inclosed in and protected by the hub. As the clutch-ring is held from rotation by the friction holding devices while being shifted longitudinally, the longitudinal movement is immediate and positive. The clutch-ring and holding devices are carried with the hub, driving-sleeve, and shifting ring when driving forwardly and held out of engagement with the brake-shoe, and when coasting they, together with the driving-sleeve and shifting ring, are held stationary and out of contact with the driving clutch-face of the hub. There is therefore no drag or friction, and consequently practically no wear at any time.

We claim as our invention—

1. The combination of an axle, a wheel-hub mounted to rotate about said axle and provided with a brake-surface and a clutch-face, a brake-shoe located in and movable longitudinally in the hub, means for holding said brake-shoe from rotation, a longitudinally-movable clutch device arranged between said brake-shoe and said clutch-face on the wheel-hub, said clutch device having a driving clutch-face coöperating with said clutch-face on the hub, a shifting device for moving said clutch device longitudinally to move the brake-shoe longitudinally, means for operating the shifting device, and a holding device to hold said clutch device from rotation while being moved longitudinally, substantially as set forth.

2. The combination of an axle, a wheel-hub mounted to rotate about said axle and provided with a brake-surface and a clutch-face, a brake-shoe longitudinally movable in said hub and having a brake-surface coöperating with said brake-surface on the hub, means for holding the brake-shoe from rotation, a longitudinally-movable clutch device arranged between said brake-shoe and said clutch-face on the hub, said clutch device having a driving clutch-face coöperating with said clutch-face on the hub, and having a part adapted to engage said brake-shoe to move the same longitudinally, means for shifting said clutch device longitudinally, and holding devices carried by said clutch device and acting to hold the same from rotation while being moved longitudinally, substantially as set forth.

3. The combination of an axle, a wheel-hub mounted to rotate about said axle and provided with a brake-surface and a clutch-face, a brake-shoe located in and longitudinally movable in the hub and provided with a braking-surface coöperating with said braking-surface on the hub, means for holding said brake-shoe from rotation, a rotatable driving-sleeve, a longitudinally-movable clutch device provided with a clutch-face coöperating with said clutch-face on the hub, and with a face coöperating with a face on said brake-shoe, means operated by said driving-sleeve for shifting said clutch device longitudinally, and a friction device carried by said clutch device and adapted to frictionally engage with said clutch-face on the hub in one position of the clutch device and with a face carried by the brake-shoe in another position of the clutch device, substantially as set forth.

4. The combination of an axle, a wheel-hub mounted to rotate thereon and provided with a brake-surface and a clutch-face, a brake-shoe arranged in said hub between said brake-surface and said clutch-face and having a face coöperating with said brake-surface and a friction-face, a longitudinally-movable clutch device arranged between said shoe and said clutch-face on the hub, means for moving the same longitudinally, a clutch-face on said clutch device coöperating with said clutch-face on the hub, friction holding devices carried by said clutch device, and means for holding said friction devices toward said friction-face on the brake-shoe and said clutch-face on the hub, substantially as set forth.

5. The combination of an axle, a hub mounted to rotate thereon and provided with a brake-surface and a clutch-face, a brake-shoe located in and longitudinally movable in said hub between said brake-surface and said clutch-face and having an internal friction-face, means for holding said brake-shoe from rotation, a clutch-ring arranged between said brake-shoe and said clutch-face on the hub and surrounded by said internal friction-face of the brake-shoe, a spring-pressed friction holding device seated in a recess in said clutch-ring and coöperating with said clutch-face on the hub and with said internal friction-face on the brake-shoe, and means for shifting said clutch-ring longitudinally, substantially as set forth.

6. The combination of an axle, a hub mounted to rotate thereon and provided with a brake-surface and a clutch-face, a brake-shoe arranged in the hub between said brake-surface and said clutch-face and provided with an internal friction-face, means for holding said brake-shoe from rotation, a longitudinally-movable clutch-ring having a clutch-face coöperating with said clutch-face on the wheel-hub, and surrounded by said friction-face on said brake-shoe, said clutch-ring having oppositely-arranged slots or depressions therein, a friction holding device located in each of said slots or depressions in the clutch-ring, a spring in each of said slots beneath said holding device and acting to move the same outwardly, said friction holding device having a face coöperating with said clutch-face on the hub and a face coöperating with said internal friction-face on said brake-shoe, and means for moving said clutch-ring laterally and rotating the same, substantially as set forth.

7. The combination of an axle, a wheel-hub mounted to rotate thereon and having a brake-surface and a conical clutch-face, a brake-shoe arranged in said hub between said brake-surface and said conical clutch-face and having an internal friction-face, means for holding said brake-shoe from rotation, a clutch-ring arranged between said brake-shoe and said conical clutch-face on the hub, and provided with a conical clutch-face and extending within said internal friction-face of the brake-shoe, said clutch-ring having slots therein, a friction holding device arranged in each of said slots, a spring in each of said slots beneath said friction holding device and tending to move the same into engagement with said internal friction-face on the brake-shoe and said conical clutch-face on the hub, means for holding said friction holding devices and springs from longitudinal movement on the clutch-ring, means for moving said clutch-ring longitudinally into engagement with said brake-shoe or with said conical clutch-face on the hub, and means for rotating said clutch device, substantially as set forth.

8. The combination of an axle, a wheel-hub journaled to rotate about said axle and having a brake-surface and a conical clutch-face, a brake-shoe in said hub between said brake-surface and said clutch-face and having an internal friction-face, means for holding said brake-shoe from rotation, a clutch-ring arranged between said brake-shoe and said conical clutch-face on the hub, and provided with a conical clutch-face and extending within said internal friction-face of the brake-shoe, said clutch-ring having a peripheral slot therein, a spring-pressed friction holding device arranged longitudinally of the clutch-ring in said slot and having an inclined face circumferentially in line with the conical face of said clutch-ring, and a face coöperating with said internal friction-face of the brake-shoe, means for preventing longitudinal movement of said friction holding device in said slot, and means for moving said clutch-ring laterally and for rotating the same, substantially as set forth.

Witness our hands this 30th day of November, 1901.

FISHER C. ATHERTON.
CONRAD HAPP.

Witnesses:
JNO. J. BONNER,
CLAUDIA M. BENTLEY.